US009870513B2

United States Patent
Thiel et al.

(10) Patent No.: US 9,870,513 B2
(45) Date of Patent: Jan. 16, 2018

(54) METHOD AND DEVICE FOR DETECTING OBJECTS FROM DEPTH-RESOLVED IMAGE DATA

(71) Applicant: Conti Temic microelectronic GmbH, Nuremberg (DE)

(72) Inventors: Robert Thiel, Niederstaufen (DE); Alexander Bachmann, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 28 days.

(21) Appl. No.: 14/902,176

(22) PCT Filed: Sep. 4, 2014

(86) PCT No.: PCT/DE2014/200443
§ 371 (c)(1),
(2) Date: Dec. 30, 2015

(87) PCT Pub. No.: WO2015/032399
PCT Pub. Date: Mar. 12, 2015

(65) Prior Publication Data
US 2016/0371549 A1    Dec. 22, 2016

(30) Foreign Application Priority Data

Sep. 9, 2013   (DE) .................. 10 2013 217 915

(51) Int. Cl.
*G06K 9/00*      (2006.01)
*B60R 1/00*      (2006.01)
(Continued)

(52) U.S. Cl.
CPC ............ *G06K 9/00805* (2013.01); *B60R 1/00* (2013.01); *G06K 9/00208* (2013.01);
(Continued)

(58) Field of Classification Search
CPC ........... G06K 9/00; H04N 13/00; B60R 21/00
(Continued)

(56) References Cited

U.S. PATENT DOCUMENTS

| 7,046,822 B1 * | 5/2006 | Knoeppel | B60W 30/16 348/169 |
| 8,401,225 B2 * | 3/2013 | Newcombe | G06T 7/194 382/100 |

(Continued)

FOREIGN PATENT DOCUMENTS

| DE | 102011101246 | 11/2012 |
| DE | 102012113009 | 6/2014 |

(Continued)

OTHER PUBLICATIONS

International Search Report of the International Searching Authority for International Application PCT/DE2014/200443, dated Jan. 26, 2015, 3 pages, European-Patent Office, HV Rijswijk, Netherlands.
(Continued)

*Primary Examiner* — Abolfazl Tabatabai
(74) *Attorney, Agent, or Firm* — W. F. Fasse

(57) ABSTRACT

An object-recognition method for a vehicle's driver assistance system involves obtaining a 2D image and a 3D image, forming a 3D apparent object from the 3D image, detecting one or more detected objects in a portion of the 2D image corresponding to the apparent object from the 3D image, classifying the one or more detected objects into at least one pre-defined object class, and dividing the apparent object into at least two 3D objects when the apparent object does not correspond with at least one class-specific property of the determined at least one object class.

20 Claims, 1 Drawing Sheet

(51) Int. Cl.
*G06K 9/34* (2006.01)
*G06K 9/62* (2006.01)
*H04N 13/02* (2006.01)
*H04N 5/225* (2006.01)

(52) U.S. Cl.
CPC .......... *G06K 9/342* (2013.01); *G06K 9/6267* (2013.01); *H04N 13/0203* (2013.01); *H04N 13/0271* (2013.01); *H04N 13/0275* (2013.01); *B60R 2300/107* (2013.01); *B60R 2300/8093* (2013.01)

(58) Field of Classification Search
USPC .......... 382/103, 104, 236; 348/169–172, 352
See application file for complete search history.

(56) References Cited

U.S. PATENT DOCUMENTS

| | | |
|---|---|---|
| 2007/0183669 A1 | 8/2007 | Owechko et al. |
| 2008/0049975 A1 | 2/2008 | Stiegler |
| 2011/0137527 A1 | 6/2011 | Simon et al. |
| 2014/0160252 A1 | 6/2014 | Randier et al. |
| 2014/0176679 A1 | 6/2014 | Lehning |

FOREIGN PATENT DOCUMENTS

| | | |
|---|---|---|
| EP | 1 652 161 | 5/2006 |
| EP | 2 811 423 | 12/2014 |

OTHER PUBLICATIONS

PCT International Preliminary Report on Patentability including English Translation of PCT Written Opinion of the International Searching Authority for International Application PCT/DE2014/200443, dated Mar. 15, 2016, 11 pages, International Bureau of WIPO, Geneva, Switzerland.

German Search Report for German Patent Application No. 10 2013 217 915.4, dated Jul. 11, 2014, 7 pages, Muenchen, Germany, with English translation, 5 pages.

Bernt Schiele et al., "Kapitel 16: Kamerabasierte Fußgängerdetektion" ("Chapter 16: Camera Based Pedestrian Detection"), in "Handbuch Fahrerassistenzsysteme: Grundlagen, Komponenten und Systeme für aktive Sicherheit und Komfort" ("Handbook of Driver Assistance Systems: Fundamentals, Components and Systems for Active Safety and Comfort"), 2009, Vieweg + Teubner, Wiesbaden, Germany, XP002733975, ISBN 978-3-8348-0287-3, pp. 223 to 235, especially pp. 232-233 and Fig. 16-15 (in German).

Christoph Stiller et al., "Kapitel 15: Maschinelles Sehen" ("Chapter 15: Machine Vision"), in "Handbuch Fahrerassistenzsysteme: Grundlagen, Komponenten und Systeme für aktive Sicherheit und Komfort" ("Handbook of Driver Assistance Systems: Fundamentals, Components and Systems for Active Safety and Comfort"), 2009, Vieweg + Teubner, Wiesbaden, Germany, XP002730622, pp. 216 to 219, especially pp. 217-218 (in German).

D. M. Gavrila et al., "Multi-cue Pedestrian Detection and Tracking from a Moving Vehicle", International Journal of Computer Vision, vol. 73, No. 1, Jul. 17, 2006, XP019468627, pp. 41 to 59.

Bernt Schiele et al., "Chapter 16: Camera Based Pedestrian Detection", in "Handbook of Driver Assistance Systems", 2016, Springer International Publishing, Switzerland, pp. 525 to 545.

Christoph Stiller et al., "Chapter 15: Fundamentals of Machine Vision", in "Handbook of Driver Assistance Systems", 2016, Springer International Publishing, Switzerland, pp. 461 to 493.

\* cited by examiner

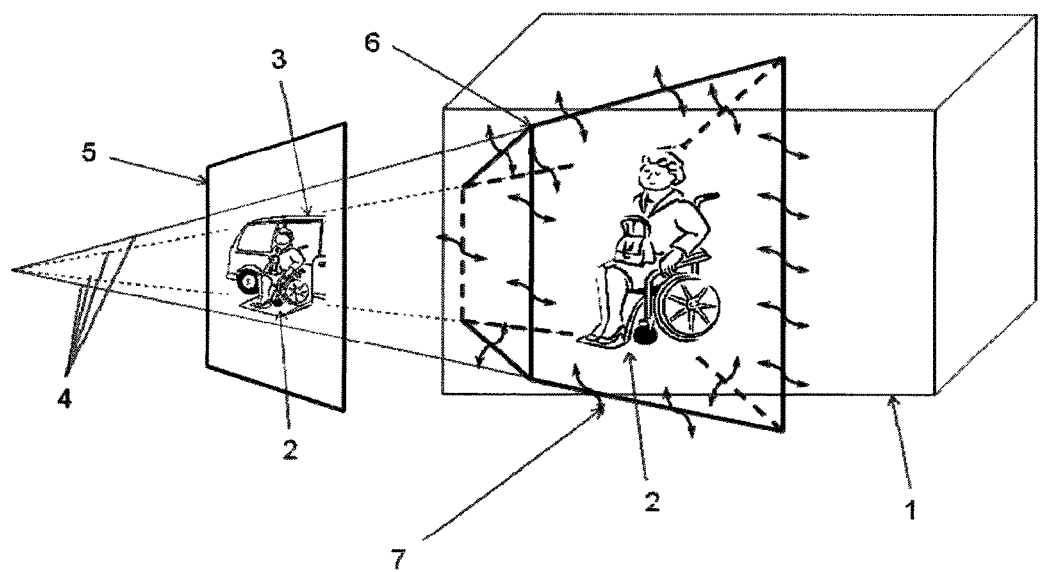

METHOD AND DEVICE FOR DETECTING OBJECTS FROM DEPTH-RESOLVED IMAGE DATA

FIELD OF THE INVENTION

The invention relates to a method and a device for detecting objects from depth-resolved image data, said method being used in particular in a driver assistance system having a 3D or stereo camera.

BACKGROUND INFORMATION

Driver assistance systems having a vehicle camera are increasingly widespread. In addition to mono cameras, 3D cameras and stereo cameras are also used. In the case of stereo cameras it is possible to calculate depth information for each pixel from the image information of both camera sensors. A depth image resulting therefrom can then be clustered, in order to detect raised objects in front of the camera.

EP 1 652 161 B2 shows a device for classifying at least one object in the surroundings of a vehicle, which detects objects by means of surroundings sensor technology and classifies said objects by reference to their three-dimensional shape and their dimensions.

A rejection class is provided for objects, the three-dimensional shape and dimensions of which do not correspond to the characteristic three-dimensional shapes and dimensions of the given classes such as e.g. trucks, cars, motorcycles, bicycles and pedestrians, etc.

This rejection class can, in some circumstances, include relevant objects, e.g. due to defective detection and/or evaluation of the surroundings sensor technology, which are then not taken into account for driver assistance functions, as the objects of the rejection class are of course rejected.

SUMMARY OF THE INVENTION

In view of the above, it is an object of at least one embodiment of this invention to overcome the indicated difficulties and/or disadvantages resulting from the prior art, and to indicate an improved method for detecting objects from depth-resolved image data.

A starting point of this invention is that e.g. two objects which merge with one another spatially are not clearly detected as two separate objects from the 3D depth information, but instead a single larger apparent object is detected. It will not be possible to correctly classify this larger (combined) apparent object either by reference to its three-dimensional shape or by reference to its dimensions.

A method for detecting objects according to an embodiment of the invention comprises the following steps:
forming at least one apparent object from a 3D image of a 3D camera,
evaluating and classifying one or more detected objects in a portion of a 2D image which corresponds to the at least one formed object in the 3D image,
possibly dividing the at least one apparent object formed from the 3D image into a plurality of individual objects while taking into account the classification of the one or more detected objects in the 2D image.

The 3D camera can, in particular, be a stereo camera and the 2D image can preferably be acquired with one of the two stereo camera sensors. Alternative 3D cameras are e.g. time-of-flight cameras, in particular a photonic mixer device (PMD). A 3D image, e.g. a three-dimensional image and/or a depth-resolved image and/or a depth image can be acquired with the 3D camera. Three-dimensionally related or coherent apparent objects can be formed from this three-dimensional image or depth-resolved image data (depth image). Since the spatial position and extension of the formed apparent objects are known, and knowing the imaging properties of the monocular camera sensor, it is in particular possible to determine the area in the 2D image in which the formed apparent objects are imaged. At least this area of the 2D image is evaluated and (2D) objects found there are classified. The evaluation in the 2D image preferably includes edge detection, intensity and/or color value analysis, segmentation and/or pattern detection. This can advantageously be followed by 2D object forming. During the classification, objects from the 2D image data are assigned to different classes of objects. This assignment can also take place by means of probability information. Typical average 3D dimensions and, if applicable, shapes are assigned to a class of objects such as e.g. "minicar", "compact car", "medium-sized car", "large car" "SUV", "van", "motorcycle", "cyclist", "adult pedestrian", "child" and "wheelchair user". Taking into account these class-specific properties and/or 3D dimensions, which result from the 2D image, the formed (three-dimensional) object can finally be divided into at least two individual objects. If, however, the class-specific properties sufficiently correspond to the formed object, the formed object can be verified.

The 3D image and the 2D image preferably represent at least partially overlapping areas of the surroundings of a vehicle. This is particularly the case of a vehicle stereo camera for monitoring the surroundings. 3D and 2D images preferably provide data for at least one driver assistance function. Known camera-based driver assistance functions are e.g. lane departure warning (LDW), lane keeping assistance/system (LKA/LKS), traffic sign recognition (TSR), speed limit assist (SLA), intelligent headlamp control (IHC), forward collision warning (FCW), precipitation/rain and/or daylight detection, adaptive cruise control (ACC), parking assist as well as automatic emergency brake assist (EBA) or emergency steering assist (ESA).

In a preferred embodiment, at least one 3D placeholder is determined according to the result of the classification of the one or more objects in the 2D image and is taken into account as a placeholder for this object in the depth image.

A frustrum is advantageously used as a 3D placeholder. The frustum is formed from the typical three-dimensional dimensions of the classified object in the 2D image and the distance resulting from the depth image. The three-dimensional shape of a truncated pyramid can be used as the three-dimensional shape of the frustum according to a vanishing point perspective.

According to a preferred embodiment, the 3D placeholder can take into account tolerances resulting from the 3D and/or 2D image detection and evaluation. The three-dimensional position determination is therefore defective and e.g. noises in the 2D image can result in an inaccuracy in the classification.

The 3D placeholder can advantageously take into account the spread of 3D dimensions within a class of objects. In the case of the "adult pedestrian" class, the height can, for example, be spread between 1.50 and 2.30 meters about an average value of e.g. 1.70 meters.

The area of the 3D placeholder is preferably separated out from the at least one object which was formed from the depth image.

In a preferred embodiment, taking into account the at least one 3D placeholder, objects are formed again from the depth image, wherein object forming beyond the limits of the 3D placeholder is made difficult. Tolerances and spreads can hereby be taken into account by different "obstacles".

The 3D placeholder is preferably compared with the at least one object formed from the depth image and, if the relevant volumes of space correspond approximately, this object is not divided. As a result, the formed object is verified.

The invention additionally relates to a device for detecting objects in a vehicle environment comprising a 3D camera which is set up to detect a depth image, a first object forming unit which is set up to format least one object from the depth image, a camera sensor for acquiring a 2D image, a 2D image evaluating and classifying unit for classifying the one or more objects in the 2D image which corresponds to the at least one formed object in the depth image and an object dividing unit which can divide the at least one object formed from the depth image into a plurality of individual objects while taking into account the classification of the one or more objects in the 2D image.

BRIEF DESCRIPTION OF THE DRAWINGS

The invention will be explained in more detail below by means of embodiment examples and a single figure that schematically represents a 3D object in a 3D image and a corresponding 2D image.

DETAILED DESCRIPTION OF EXAMPLE EMBODIMENTS OF THE INVENTION

The sole FIGURE schematically shows a cuboid for the depth image of an object (1) which was acquired with a stereo camera. The object consists of a wheelchair user (2) and a car (3), e.g. a van. As the wheelchair user (2) is located right in front of the car (3) there is therefore no spatial separation between these two, both are established and/or clustered as a single object from a 3D image of the stereo camera.

The illustration according to FIG. 1 also includes a 2D image (5) which was preferably acquired by one of the two stereo camera sensors. The represented 2D image (5) is located in the virtual image plane of the acquiring camera and includes the wheelchair user (2) and at least partially the car (3). The image area of the 2D image which corresponds to the established depth image of the object (1) can be determined in advance, so that only said image area is further analyzed in the 2D image. A known image processing method in two-dimensional image data can be used for the analysis in the 2D image, in particular edge detection, intensity and/or color value analysis, segmentation and/or pattern detection.

The image processing method or methods are advantageously followed by object forming and classification based on the 2D image data. The result of the object classification from the 2D image is that, in this case, at least one first object can be classified as a "wheelchair user", and a second object can possibly be classified as a "car" or "van". It is possible that the second object cannot be classified here, since the car is not completely included in the 2D image and is also partially obscured by the wheelchair user. However, this is not of any further importance at this point.

A placeholder (6) is then formed for the depth image regarding the object which has been successfully classified as a "wheelchair user". To this end, a frustum (6) is generated from the size of the object which is classified as a "wheelchair user" in the 2D image (5) and the distance resulting from the depth image and the class-specific depth of the object. This frustum (6) also takes into account tolerances and deviations which, due to the accuracy of the 3D detection, take account of noises in the 2D image and/or spreads of typical object dimensions of a class around average object dimensions. The frustum (6) thus performs the function of a placeholder. To this end, typical spatial dimensions of a "wheelchair user" are to be accepted. With the aid of these dimensions and the known distance from the camera from the depth image for each pixel, the frustum can be established as a projection into the spatial field of view (4) of the stereo camera. The frustum (6) has, in the case of a vanishing point perspective of the field of view (4), the three-dimensional shape of a truncated pyramid which is shown schematically in the FIGURE.

With the aid of the frustum (6), connections to outside the frustum are then made configurably more difficult (7) in the space for the clustering. As a result objects, which can only be separated with difficulty in the depth image, can be cleanly separated in the space. This is the case for the wheelchair user (2) and the car (3) as shown here. Similarly, this also applies to the resolution (object splitting) of groups of pedestrians, a person leaning against a house wall, vehicles parked very closely to one another or other objects which merge with one another spatially.

The advantage of this for driver assistance functions which are based on detected objects is that, in the case of the imaged scene, the wheelchair user (2) is reliably detected as an independent object and the car or van (3) is then also detected in a comparable manner.

On the other hand, the detection from the depth image of this scene only supplies one object (1) which is too extended for both of the object classes which are actually present and is at risk of not being able to be classified at all. A protective measure of a driver assistance system for the benefit of the wheelchair user (2) may possibly be omitted, because the latter is not detected as a "wheelchair user" at all.

LIST OF REFERENCE NUMERALS

1 Object formed from the depth image
2 Wheelchair user
3 Car
4 Field of view
5 2D image
6 Placeholder/frustum
7 Connection made difficult during clustering from outside into the frustum and/or outwardly from the frustum

The invention claimed is:
1. An object recognition method for a driver assistance system of a vehicle, comprising the step:
 a) with a camera system of the vehicle, producing a 2D image and a 3D image of a scene outside of the vehicle;
 and further comprising the following steps performed with the driver assistance system:
 b) from the 3D image, forming a three-dimensionally coherent apparent object;
 c) performing image evaluation of an image portion of the 2D image that corresponds to the apparent object formed from the 3D image, and thereby detecting one or more detected objects in the image portion of the 2D image;
 d) performing classification of the one or more detected objects respectively into one or more pre-defined object classes;
 e) assigning respective class-specific 3D dimensions respectively to the one or more detected objects based on the respective object class into which each of the one or more detected objects was classified;
f) from the 3D image, determining apparent 3D dimensions of the apparent object;
g) comparing the apparent 3D dimensions of the apparent object with the respective class-specific 3D dimensions assigned respectively to the one or more detected objects; and
h) when the comparing in the step g) indicates that the apparent object is larger than the class-specific 3D dimensions respectively assigned to the one or more detected objects, then dividing the apparent object into at least two three-dimensional objects.

2. The object recognition method according to claim 1, further comprising the following step performed with the driver assistance system:
i) when the comparing in the step g) indicates that the apparent 3D dimensions of the apparent object correspond with the class-specific 3D dimensions assigned to a matching one of the one or more detected objects, then the apparent object is not divided and instead is verified as the matching one of the one or more detected objects.

3. The object recognition method according to claim 2, further comprising, with the driver assistance system performing a driver assistance function based on the matching one of the one or more detected objects.

4. The object recognition method according to claim 1, further comprising, with the driver assistance system performing a driver assistance function based on the at least two three-dimensional objects.

5. The object recognition method according to claim 1, wherein the dividing of the apparent object into the at least two three-dimensional objects is performed based on the class-specific 3D dimensions assigned to the one or more detected objects.

6. The object recognition method according to claim 1, wherein:
the camera system comprises a 3D camera and a 2D camera,
the 3D camera comprises a stereo camera, a time-of-flight camera, or a photonic mixer device,
the 3D camera produces the 3D image,
the 2D camera produces the 2D image,
the scene outside the vehicle represents surroundings outside the vehicle, and
the 3D image and the 2D image represent at least partially overlapping areas of the surroundings.

7. The object recognition method according to claim 6, wherein the 3D camera comprises the stereo camera which includes two monocular camera sensors, and wherein the 2D camera comprises one of the two monocular camera sensors of the stereo camera.

8. The object recognition method according to claim 1, further comprising determining at least one 3D placeholder according to a result of the classification of the one or more detected objects, and taking the at least one 3D placeholder into account as at least one replacement for the apparent object in the 3D image.

9. The object recognition method according to claim 8, wherein the at least one 3D placeholder respectively is a frustum.

10. The object recognition method according to claim 8, wherein the at least one 3D placeholder respectively takes into account tolerances resulting from the object forming in the step b) and/or the image evaluation and object detection in the step c).

11. The object recognition method according to claim 8, wherein the at least one 3D placeholder respectively takes into account a spread range of 3D dimensions within the class-specific 3D dimensions of each respective one of the one or more pre-defined object classes.

12. The object recognition method according to claim 8, further comprising comparing the at least one 3D placeholder with the apparent object, and when a matching one of the at least one 3D placeholder corresponds approximately with the apparent object then the apparent object is not divided and instead is verified as corresponding to one of the detected objects represented by the matching one of the at least one 3D placeholder.

13. The object recognition method according to claim 8, further comprising forming a three-dimensionally coherent further apparent object from the 3D image while taking into account the at least one 3D placeholder, wherein the forming of the further apparent object beyond spatial limits of the at least one 3D placeholder is made difficult.

14. A device for performing the method according to claim 1, comprising:
a 3D camera of the camera system configured and arranged to produce the 3D image,
a camera sensor of the camera system configured and arranged to produce the 2D image,
a first object forming unit configured and arranged to perform the step b), and
an image evaluation and classification device configured and arranged to perform the steps c), d), e), f), g) and h).

15. An object recognition method for a driver assistance system of a vehicle, comprising the following steps performed with the driver assistance system:
forming at least one 3D object from a depth image of a 3D camera,
evaluating and classifying at least one 2D object in a 2D image which corresponds to the at least one 3D object formed from the depth image,
evaluating and classifying the at least one 3D object, which comprises dividing the at least one 3D object into a plurality of individual 3D objects, when at least one property of the at least one 3D object does not match a corresponding property determined by the classification of the at least one 2D object in the 2D image, and
determining at least one 3D placeholder according to a result of the classifying of the at least one 2D object, and taking the at least one 3D placeholder into account as respectively at least one replacement for the at least one 3D object in the depth image.

16. The object detection method according to claim 15, wherein the 3D placeholder is a frustum.

17. The object detection method according to claim 15, wherein the 3D placeholder takes into account tolerances resulting from the 3D and/or 2D image detection and evaluation.

18. The object detection method according to claim 15, wherein the 3D placeholder takes into account a spread of 3D dimensions within a class of objects.

19. The object detection method according to claim 15, further comprising comparing the 3D placeholder with the at least one 3D object and, if the 3D placeholder corresponds approximately to the 3D object, then the 3D object is not divided.

20. The object detection method according to claim 15, further comprising forming at least one renewed 3D object from the depth image while taking into account the at least one 3D placeholder, wherein object forming beyond limits of the 3D placeholder is made difficult.

\* \* \* \* \*